United States Patent [19]

Shinopulos et al.

[11] 4,349,145
[45] Sep. 14, 1982

[54] METHOD FOR BRAZING A SURFACE OF AN AGE HARDENED CHROME COPPER MEMBER

[75] Inventors: George Shinopulos; M. Ronald Randlett, both of Burlington; Terry F. Bower, Needham, all of Mass.

[73] Assignee: Kennecott Corporation, Stamford, Conn.

[21] Appl. No.: 212,595

[22] Filed: Dec. 3, 1980

Related U.S. Application Data

[62] Division of Ser. No. 57,411, Jul. 13, 1979, Pat. No. 4,307,770, which is a division of Ser. No. 928,881, Jul. 28, 1978, Pat. No. 4,211,270.

[51] Int. Cl.³ .......................... B23K 1/04; B23K 1/20
[52] U.S. Cl. ................................... 228/208; 228/135; 228/248; 228/263 E
[58] Field of Search ............... 228/208, 209, 210, 219, 228/220, 221, 248, 249, 263 E; 75/153; 428/677

[56] References Cited

U.S. PATENT DOCUMENTS 2,426,467  8/1947  Nelson ................................... 75/153
3,925,070 12/1975  Cape ................................. 75/153 X
4,077,114  3/1978  Sakuma ........................... 228/121 X
4,223,826  9/1980  Vsui ..................................... 228/208

OTHER PUBLICATIONS

Schwartzmaier *Nepreryvnoe Razlivke* (continuous casting) State Scientific & Technical Publishers of Literature on Ferrous and Non Ferrous Metals, Moscow 1962, p. 167.

E. German *Nepreryvnoe Lit'e* (continuous casting) "Metallurgizda" Publishers 1961, pp. 162–163, 512–513.

*Primary Examiner*—Kenneth J. Ramsey
*Attorney, Agent, or Firm*—Anthony M. Lorusso; R. Lawrence Sahr

[57] ABSTRACT

A method for brazing a surface of an age hardened chrome copper member to a surface of a stainless steel member is disclosed. The process includes plating surfaces with copper, applying a brazed material of a copper/gold alloy between said surfaces, applying a brazing paste between said surfaces and rapidly heating the materials to fuse them together in a protected atmosphere. A particular disclosed embodiment of the method comprises the brazing of the cooler body assembly of a continuous casting die for casting copper strands.

4 Claims, 4 Drawing Figures

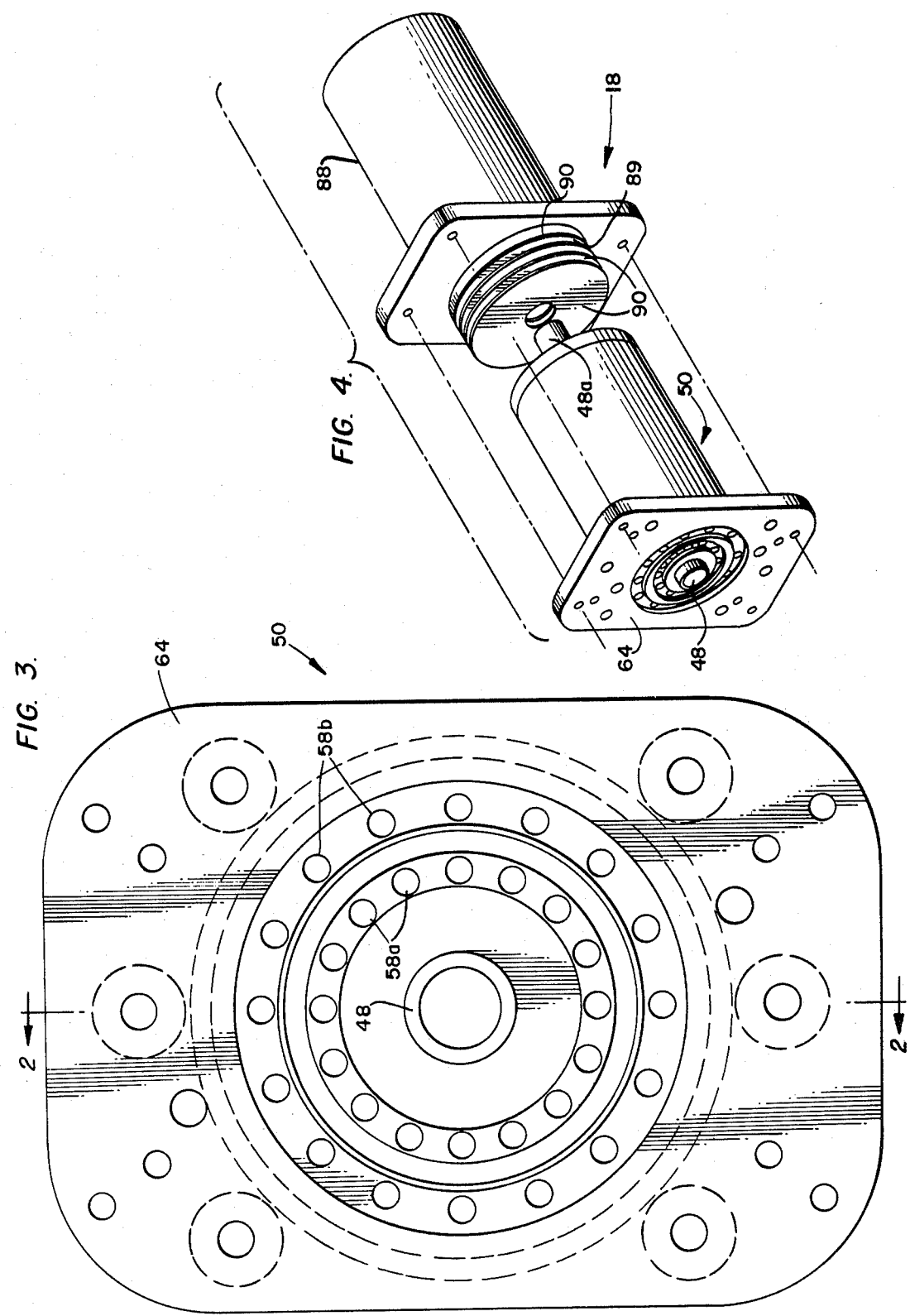

METHOD FOR BRAZING A SURFACE OF AN AGE HARDENED CHROME COPPER MEMBER

This is a division of application Ser. No. 57,411, filed July 13, 1979, now U.S. Pat. No. 4,307,770, which is a division of Ser. No. 928,881, filed July 28, 1978, (now U.S. Pat. No. 4,211,270).

BACKGROUND OF THE INVENTION

This invention relates in general to the brazing of an age hardened chrome copper member to a stainless steel member, such as in a cooled mold assembly for the continuous, high-speed casting of strands of copper and copper alloys including brass.

It is well known in the art to cast indefinite lengths of metallic strands from a melt by drawing the melt through a cooled mold. The mold generally has a die of a refractory material such as graphite cooled by a surrounding water jacket. U.S. Pat. No. 3,354,936 for example, describes a cooled mold assembly scaled into the bottom wall of the melt container to downcast large billets. The force of gravity feeds the melt through the mold. In downcasting, however, there is a danger of a melt "break out" and the melt container must be emptied or tilted to repair or replace the mold or the casting die.

Horizontal casting through a chilled mold has also been tried. Besides the break out and replacement problems of downcasting, gravity can cause a non-uniform solidification resulting in a casting that is not cross-sectionally uniform or having an inferior surface quality.

Finally, various arrangements have been used for upcasting. Early efforts are described in U.S. Pat. No. 2,553,921 to Jordan and U.S. Pat. No. 2,171,132 to Simons. Jordan employs a water cooled, metallic "mold pipe" with an outer ceramic lining that is immersed in a melt. In practice, no suitable metal has been found for the mold pipe, the casting suffers from uneven cooling, and condensed metallic vapors collect in a gap between the mold pipe and the liner due to differences in their coefficients of thermal expansion. Simons also uses a water-cooled "casing" but it is mounted above the melt and a vacuum is required to draw melt up to the casing. A coaxial refractory extension of the casing extends into the melt. The refractory extension is necessary to prevent "mushrooming", that is, the formation of a solid mass of the metal with a diameter larger than that of the cooled casing. As with Jordan, thermally generated gaps, in this instance between the casing and the extension, can collect condensed metal vapors which results in poor surface quality or termination of the casting.

U.S. Pat. Nos. 3,746,077 and 3,872,913 describe more recent upcasting apparatus and techniques. The 3,872,913 patent avoids problems associated with thermal expansion differences by placing only the tip of a "nozzle" in the melt. A water-cooled jacket encloses the upper end of the nozzle. Because the surface of the melt is below the cooling zone, a vacuum chamber at the upper end of the nozzle is necessary to draw the melt upwardly to the cooling zone. The presence of the vacuum chamber however limits the rate of strand withdrawal and requires a seal.

The 3,746,077 patent avoids the vacuum chamber by immersing a cooling jacket and a portion of an enclosed nozzle into the melt. The immersion depth is sufficient to feed melt to the solidification zone, but it is not deeply immersed. The jacket as well as the interfaces between the jacket and the nozzle are protected against the melt by a surrounding insulating lining. The lower end of the lining abuts the lower outer surface of the nozzle to block a direct flow of the melt to the cooling jacket.

The foregoing systems are commonly characterized as "closed" mold in that the liquid metal communicates directly with the solidification front. The cooled mold is typically fed from an adjoining container filled with the melt. In contrast, an "open" mold system feeds the melt, typically by a delivery tube, directly to a mold where it is cooled very rapidly. Open mold systems are commonly used in downcasting large billets of steel, and occasionally aluminum, copper or brass. However, open mold casting is not used to form products with a small cross section because it is very difficult to control the liquid level and hence the location of the solidification front.

A problem that arises in closed mold casting is a thermal expansion of the bore of the casting die between the beginning of the solidification front and the point of complete solidification termed "bell-mouthing". This condition results in the formation of enlargements of the casting cross section which wedge against a narrower portion of the die. The wedged section can break off and form an immobile "skull". The skulls can either cause the strand to terminate or can lodge on the die and produce surface defects on the casting. Therefore it is important to maintain the dimensional uniformity of the die bore within the casting zone. In the 3,872,913 and 3,746,077 systems, these problems are controlled by a relatively gentle vertical temperature gradient along the nozzle due in part to a modest cooling rate to produce a generally flat solidification front. With this gentle gradient, acceptable quality castings can be produced only at a relatively slow rate, typically five to forty inches per minute.

Another significant problem in casting through a chilled mold is the condensation of metallic vapors. Condensation is especially troublesome in the casting of brass bearing zinc or other alloys bearing elements which boil at temperatures below the melting temperature of the alloy. Zinc vapor readily penetrates the materials commonly used to form casting dies as well as the usual insulating materials and can condense to liquid in critical regions. Liquid zinc on the die near the solidification front can boil at the surface of the casting resulting in a gassy surface defect. Because of these problems, present casting apparatus and techniques are not capable of commercial production of good quality brass strands at high speeds.

The manner in which the casting is drawn through the chilled mold is also an important aspect of the casting process. A cycled pattern of a forward withdrawal stroke followed by a dwell period is used commercially in conjunction with the mold unit described in the aforementioned U.S. Pat. No. 3,862,913. U.S. Pat. No. 3,908,747 discloses a controlled reverse stroke to form the casting skin, prevent termination of the casting, and compensate for contraction of the casting within the die as it cools. British Pat. No. 1,087,026 also discloses a reverse stroke to partially remelt the casting. U.S. Pat. No. 3,354,936 discloses a pattern of relatively long forward strokes followed by periods where the casting motion is stopped and reversed for a relatively short stroke. This pattern is used in downcasting large billets to prevent inverse segregation. In all of these systems, however, the stroke velocities and net casting velocities are slow. In the 3,354,936 system, for example, forward strokes are three to twenty seconds in duration, reverse strokes are one second in duration, and the net velocity is thirteen to fifteen inches per minute.

It is therefore a principal object of this invention to provide a mold assembly for the continuous casting of high quality metallic strands and particularly those of copper and copper alloys including brass at production speeds many times faster than those previously attainable with closed mold systems.

Another object of the invention is to provide such a cooled mold assembly for upcasting with the mold assembly immersed in said melt.

A further object is to provide such a mold assembly that accommodates a steep temperature gradient along a casting die, particularly at the lower end of a solidification zone, without the formation of skulls or loss of dimensional uniformity in the casting zone.

A further object is to provide a mold assembly with the foregoing advantages that has a relatively low cost of manufacture, is convenient to service and is durable.

SUMMARY OF THE INVENTION

A cooled mold assembly for continuous high-speed casting metallic strands has a hollow die formed of a refractory material. The melt, typically of copper or copper alloys such as brass is in fluid communication with one end of the die. A coolerbody, preferably water-cooled, encloses the die in a tight-fitting relationship. The coolerbody has a high cooling rate that produces a solidification front within a casting zone of the die spaced from the die end adjacent the melt. The coolerbody, shielded by an insulating hat, is at least partially immersed in the melt. Preferably it is deeply immersed with the level of the melt above the casting zone.

An insulating member that extends toward the melt from a point just below the casting zone controls the radial thermal expansion of the die to ensure that the casting occurs in a dimensionally uniform section of the die and to control bell-mouthing of the die end proximate the melt. The insulating member also provides a steep temperature gradient at the lower end of the casting zone which is conducive to a rapid cooling over a short length of the die. In a preferred form, the die projects into the melt from the lower end of the coolerbody to control mushrooming and to avoid drawing foreign materials into the casting zone. The insulating member is a bushing of a low thermal expansion, low porosity, refractory material held around the die in a counterbore formed in the coolerbody. The die is preferably formed of graphite or boron nitride and is outgassed prior to use. In another form, the die is flush with or terminates above the lower face of the coolerbody and the insulating member is a tubular refractory element located inside the die and extending from the lower end of the die to a point below the casting zone.

The casting is preferably drawn through the mold assembly in a cycle of forward and reverse strokes. For example, for ¾″ diameter strands, the net withdrawal speed is preferably in excess of eighty inches per minute with a frequency of approximately 1 to 3 cycles per second. Forward strokes are typically long, such as 1 to 1½ inches, with a high forward velocity of three to twenty inches per second and a high acceleration in excess of gravity (1 g). The reverse strokes are typically short such as 0.08 to 0.13 inch, also with a high acceleration, typically 3 g. A brief dwell period (e.g. 0.1 second) can be introduced at the end of either or both strokes.

The die preferably has a longitudinally uniform cross section. The die can have a slight upwardly narrowing taper or stepped configuration on its inner surface. The die is preferably slip fit into the coolerbody to facilitate replacement. Before the die expands thermally against the coolerbody, it is restrained against axial movement by a slight upset in the mating coolerbody wall and a stepped outer surface that engages the lower face of the coolerbody. Also in the preferred form, a metallic foil sleeve is interposed between the outside insulating member and the counterbore to facilitate removal of the insulator.

The coolerbody preferably has a double wall construction with an annular space between the walls. The inner wall adjacent the die is preferably formed from a sound ingot of age hardened chrome copper alloy; the outer sleeve is preferably formed of stainless steel. The inner and outer walls or "bodies" are preferably bonded at their lower ends by a copper/gold braze joint. Water is typically circulated in a temperature range and flow rate that yields a high cooling rate of the melt advancing through the die while avoiding condensation of water vapor on the mold assembly or the casting. A vapor shield and gaskets are preferably disposed between the immersed end of the coolerbody and the surrounding insulating hat.

These and other objects and features of the invention will become apparent to those skilled in the art from the following detailed description which should be read in light of the accompanying drawings.

BRIEF DESCRIPTION OF THE DRAWINGS

FIG. 3 is a top plan view of the mold assembly shown in FIG. 2;

FIG. 4 is an exploded perspective view of the mold assembly shown in FIGS. 2 and 3 and an exterior insulating hat.

DETAILED DESCRIPTION OF THE PREFERRED EMBODIMENTS

Figure 1:
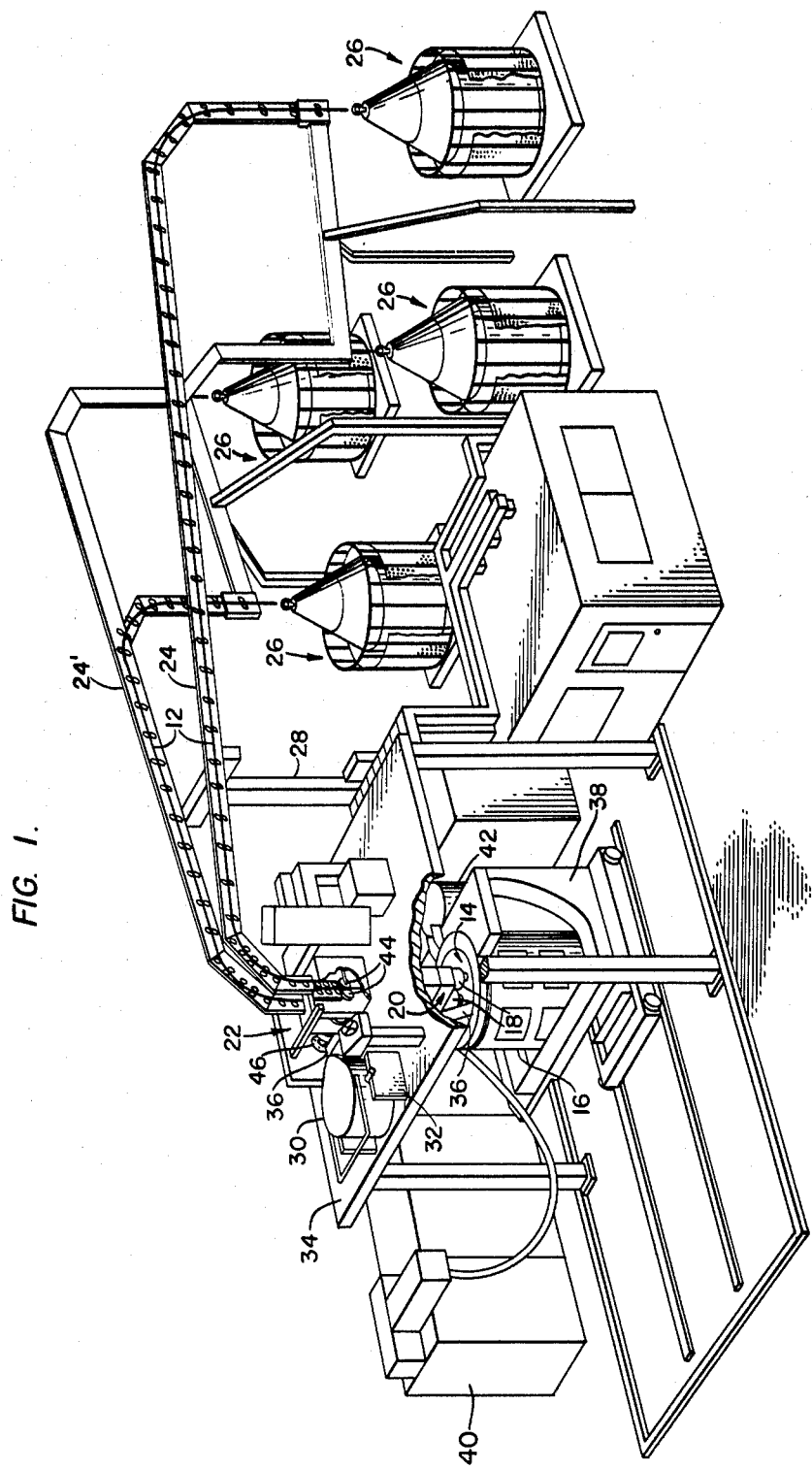
FIG. 1 is a simplified view in perspective of a strand production facility that employs mold assemblies and methods embodying the present invention.

FIG. 1 shows a suitable facility for the continuous production of metallic strands in indefinite lengths by upwardly casting the strands through cooled molds 18 according to this invention. Four strands 12 are cast simultaneously from a melt 14 held in a casting furnace 16. The strands, which can assume a variety of cross sectional shapes such as square or rectangular, will be described as rods having a substantially circular cross section with a diameter in the range of one-quarter to two inches.

With reference to FIG. 1, the strands 12 are cast in four cooled mold assemblies 18 mounted on an insulated water header 20. A withdrawal machine 22 draws the strands through the mold assemblies and directs them to a pair of booms 24, 24' that guide the strands to four pouring type coilers 26 where the strands are collected in coils. Each boom 24 is hollow to conduct cooling air supplied by the ducts 28 along the length of the boom.

The melt 14 is produced in one or several melt furnaces (not shown) or in one combination melting and holding furnace (not shown). While this invention is suitable for producing continuous strands formed from a variety of metals and alloys, it is particularly directed to the production of copper alloy strands, especially brass. A ladle 30 carried by an overhead crane (not shown) transfers the melt from the melt furnaces to the casting furnace 16. The ladle preferably has a teapot-type spout which delivers the melt with a minimum of foreign material such as cover and dross. To facilitate the transfer, the ladle is pivotally seated in support cradle 32 on a casting platform 34. A ceramic pouring cup 36 funnels the melt from the ladle 30 to the interior of the casting furnace 16. The output end of the pouring cup 36 is located below the casting furnace cover and at a point spaced from the mold assemblies 18. In continuous production, as opposed to batch casting, additional melt is added to the casting furnace when it is approximately half full to blend the melt both chemically and thermally.

The casting furnace 16 is a 38-inch coreless induction furnace with a rammed alumina lining heated by a power supply 40. A furnace of this size and type can hold approximately five tons of melt. The furnace 16 has a pour-off spout 16a that feeds to an overfill and pour-off ladle 42.

The withdrawal machine 22 has four opposed pairs of drive rolls 44 that each frictionally engage one of the strands 12. The rolls are secured on a common shaft driven by a servo-controlled, reversible hydraulic motor 46. A conventional variable-volume, constant-pressure hydraulic pumping unit that generates pressures of up to 3000 psi drives the motor 46. This power level allows forward and reverse strand accelerations of up to five times the acceleration of gravity (5 g) for average size strands. A conventional electronic programmer (not shown) produces a highly controlled program of signals that controls the operation of the motor 46 through a conventional servo system. The program allows variation in the duration, velocity and acceleration of both forward and reverse motions or "strokes" of the strand, as well as "dwell" period of no relative motion between the strand and the mold assembly following the forward and reverse strokes. The program also includes a programmed start-up routine that gradually ramps up the withdrawal speed. The drive rolls 44 can be individually disengaged from a selected strand 12 without interrupting the advance of the other strands.

A more complete disclosure of the casting apparatus can be found in our patents 4,211,270 and 4,307,770.

Figure 2:
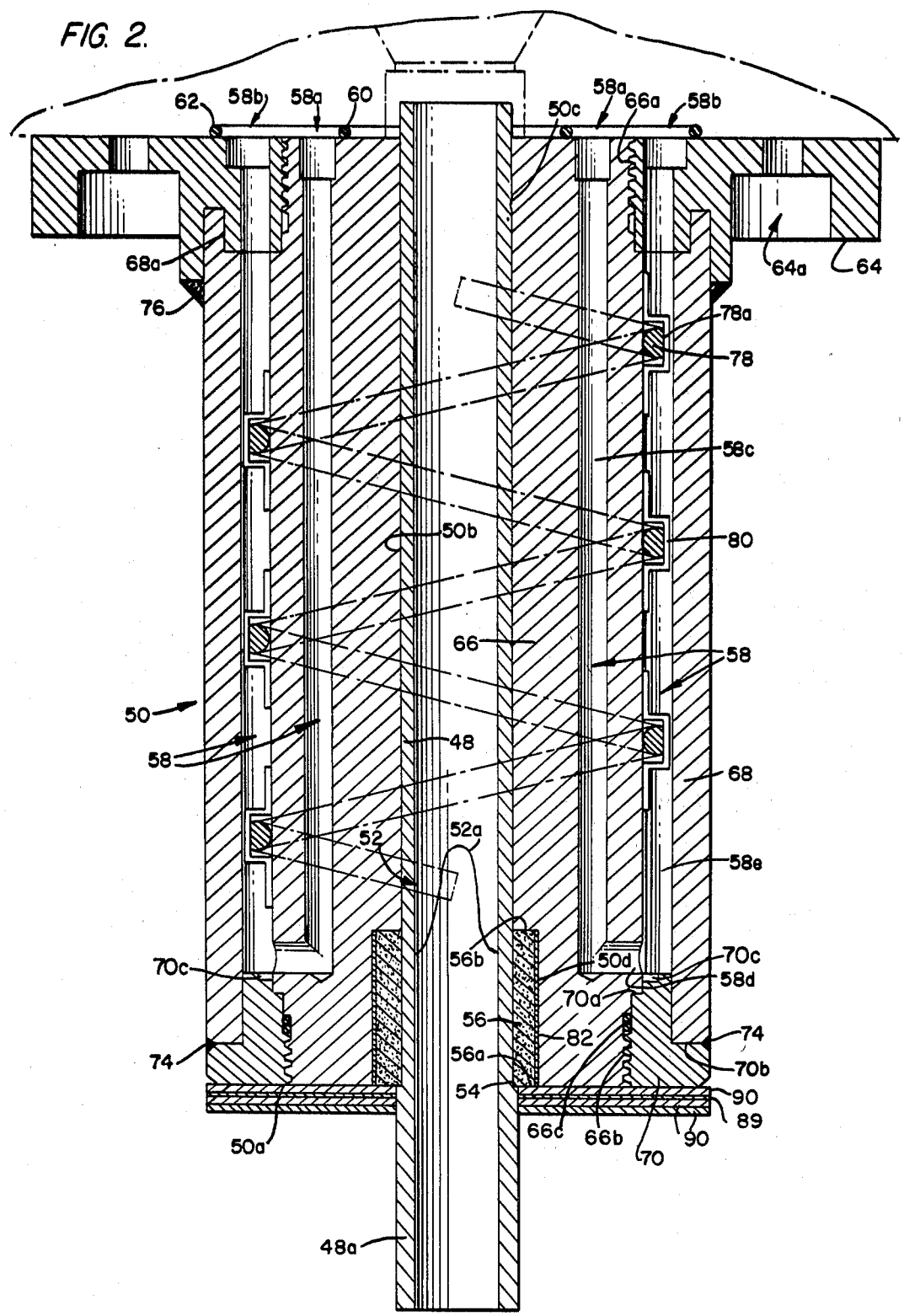
FIG. 2 is a view in vertical section of a preferred embodiment of a mold assembly constructed according to the invention and used in the facility shown in FIG. 1.

FIGS. 2-4 show a preferred embodiment of the mold assemblies 18 having a tubular die 48 enclosed by a coolerbody 50. The liner has a lower end portion 43a that projects beyond the lower face 50a of the coolerbody. The die portion 48a and at least a portion of the coolerbody are immersed in the melt 14 during casting. Molten copper or copper alloy will thus flow into the mold and will solidify along a casting zone 52 as indicated by the liquid—solid interface front 52a.

The die 48 is formed of a refractory material that is substantially non-reactive with metallic and other vapors present in the casting environment especially at temperatures in excess of 2,000° F. Graphite is the usual die material although good results have also been obtained with boron nitride. More specifically, a graphite sold by the Poco Graphite Company under the trade designation DFP-3 has been found to exhibit unusually good thermal characteristics and durability. Regardless of the choice of material for the die, before installation it is preferably outgassed in a vacuum furnace to remove volatiles that can react with the melt to cause start-up failure or produce surface defects on the casting. The vacuum also prevents oxidation of the graphite at the high outgassing temperatures, e.g. 750° F. for 90 minutes in a roughing pump vacuum. It will be understood by those skilled in the art that the other components of the mold assembly must also be freed of volatiles, especially water prior to use. Components formed of Fiberfrax refractory material are heated to about 1500° F.; other components such as those formed of silica are typically heated to 350° F. to 400° F.

Mechanical restraint is used to hold the die in the coolerbody during low speed operation or set-up prior to it being thermally expanded by the melt. A straightforward restraining member such as a screw or retainer plate has proven impractical because the member is cooled by the coolerbody and therefore condenses and collects metallic vapors. This metal deposit can create surface defects in the casting and/or weld the restraining member in place which greatly impedes replacement of the die. Zinc vapor present in the casting of brass is particularly troublesome. An acceptable solution is to create a small upset or irregularity 50c on the inner surface 50b of the coolerbody, for example, by raising a burr with a nail set. A small step 54 formed on the outer surface of the die which engages the lower face 50a of the coolerbody (or more specifically, an "outside" insulating bushing or ring 56 seated in counterbore 50d formed in the lower end of the coolerbody) indexes the die for set-up and provides additional upward constraint against any irregular high forces that may occur such as during start-up. It should also be noted that the one-piece construction of the die eliminates joints, particularly joints between different materials, which can collect condensed vapors or promote their passage to other surfaces. Also, a one-piece die is more readily replaced and restrained than a multi-section die.

The coolerbody 50 has a generally cylindrical configuration with a central, longitudinally extending opening defined by the inner surface 50b. The interior of the coolerbody has a passage designated generally at 58 that circulates the cooling fluid, preferably water, through the coolerbody. A series of coolant inlet openings 58a and coolant outlet openings 58b are formed in the upper end of the coolerbody. As is best seen in FIGS. 3 and 4, these openings are arrayed in concentric circles with sufficient openings to provide a high flow rate, typically one gallon per pound of casting per minute. A pair of O-rings 60 and 62, preferably formed of a long wearing fluoro-elastomer, seal the water header 20 in fluid communication with the inlet and outlet openings. A mounting flange 64 on the coolerbody has openings 64a that receives bolts (not shown) to secure the mold assembly to the water header. This flange also includes a hole (not shown) to vent gases from the annular space between the coolerbody and the hat through a tube (not shown) in the waterheader to atmosphere.

The coolerbody has four main components: an inner body 66, an outer body 68, a jacket closure ring 70 and the mounting flange 64. The inner body is formed of alloy that exhibits excellent heat transfer characteristics, good dimensional stability and is hard and wear resistant. Age hardened copper such as the alloy designated CDA 182 is preferred. The outer body 68, closure ring 70 and mounting flange 64 are preferably formed of stainless steel, particularly free machining 303 stainless for the ring 70 and flange 64 and 304 stainless for the outer body 68. Stainless exhibits satisfactory resistance to mechanical abuse, possesses similar thermal expansion characteristics as chrome copper, and holds up well in the casting environment. By the use of stainless steel, very large pieces of age hardened copper are not required thus making manufacture of the coolerbody more practical.

The inner body is machined from a single cylindrical billet of sound (crack-free) chrome copper. Besides cost and functional durability advantages, the composite coolerbody construction is dictated by the difficulty in producing a sound billet of chrome copper which is large enough to form the entire coolerbody. Longitudinal holes 58c are deep drilled in the inner body to define the inlets 58a. The holes 58c extend at least to the casting zone and preferably somewhat beyond it as shown in FIG. 2. Cross holes 58d are drilled to the bottom of the longitudinal holes 58c. The upper and lower end of the inner body are threaded at 66a and 66b to receive the mounting flange 64 and the closure ring 70, respectively, for structural strength. The closure ring has an inner upwardly facing recess 70a that abuts a mating step-machined on the inner body for increased braze joint efficiency, to regard the flow of cooling water into the joint, and to align the ring with the inner body. An outer, upwardly facing recess 70b seats the lower end of the outer body 68 in a fluid tight relationship.

Because the threaded connection at 66b will leak if not sealed well and is required to withstand re-solutionizing and aging of softened coolerbody bores, the joint is also copper/gold brazed. While copper/gold brazing is a conventional technique, the following procedures produce a reliable bond that holds up in the casting environment. First, the mating surfaces of the closure ring and the inner body are copper plated. The plating is preferably 0.001 to 0.002 inch thick and should include the threads, the recess 70a and groove 70c. The braze material is then applied as by wrapping a wire of the material around the inner body in a braze clearance 66c above the threads, and in the groove 70c atop closure ring 70. Two turns of a one-sixteenth inch diameter wire that is sixty percent copper and forty percent gold is recommended in clearance 66c and three turns in groove 70c. A braze paste of the same alloy is then spread over the mating surfaces. The closure ring is tightly screwed onto the inner body and the assembly is placed in a furnace, brazed end down, and preferably resting on a supported sheet of alumina silica refractory paper material such as the product sold by Carborundum Co. under the trade designation Fiberfrax. The brazing temperature is measured by a thermcouple resting at the bottom of one of the longitudinal holes 58c. The furnace brings the assembly to a temperature just below the fusing point of the braze alloy for a short period of time such as 1760° F. to 1790° F. for ten minutes. The furnace atmosphere is protected (inert or a vacuum) to prevent oxidation. The assembly is then rapidly heated to a temperature that liquifies the braze alloy (1860° F. to 1900° F.) and immediately allowed to cool to room temperature, again in a protected atmosphere. Solution treating of the chrome copper is best performed at a separate second step by firing the part to 1710°-1750° F. for 15 minutes in a protected atmosphere and followed by liquid quenching.

Once the closure ring is joined to the inner body, the remaining assembly of the coolerbody involves TIG welding type 304 to type 303 stainless steel using type 308 rod after preheating parts to 400° F. The outer body 68, which has a generally cylindrical configuration, is welded at 74 to the closure ring. The upper end of the outer body has an inner recess 68a that mates with the mounting flange 64 just outside the water outlet openings 58b. A weld 76 secures those parts. The closure ring and mounting flange space the outer body from the inner body to define an annular water circulating passage 58c that extends between the cross holes 58d and the outlet openings 58b. A helical spacer 78 is secured in the passage 58c to establish a swirling water flow that promotes a more uniform and efficient heat transfer to the water. The spacer 78 is preferably formed of one-quarter inch copper rod. The spacer coil is filed flat at points 78a to allow clearance for holding clips 80 secured to the inner body. A combination aging (hardening) treatment of the chrome copper and stress relief of the welded stainless steel is accomplished at 900° F. for at least two hours in a protected atmosphere. The coolerbody is then machined and leak tested.

By way of illustration only, cooling water is directed through the inlets 58a, the holes 58c and 58d and the spiral flow path defined by the passage 58e and the spacer 78 to the outlets 58b. The water is typically at 80° to 90° F. at the inlet and heats approximately ten to twenty degrees during its circulation through the coolerbody. The water typically flows at a rate of about one gallon per pound of strand solidified in the casting zone per minute. A typical flow rate is 25 gallons per minute. The proper water temperature is limited at the low end by the condensation of water vapor. On humid days, condensation can occur at 70° F. or below, but usually not above 80° F. Water temperatures in excess of 120° F. are usually not preferred. It should be noted that the inlet and outlet holes can be reversed, that is, the water can be applied to the outer ring of holes 58b and withdrawn from the inner ring of holes 58a with no significant reduction in the cooling performance of the coolerbody. The spacing between the liner and the inner set of holes is, however, a factor that affects the heat transfer efficiency from the casting to the water. For a three-quarter inch strand 12, the spacing is typically approximately ⅜ inch. This allows the inner body 66 to be re-bored to cast a one inch diameter strand and accept a suitably dimensional outside insulator 56. In general, the aforedescribed mold assembly provides a cooling rate that is high compared to conventional water jacket coolers for chilled mold casting in closed systems.

In practice, it has been found that metallic vapors penetrate between the inside insulating bushing 56 and the coolerbody counterbore 50d, condense, and bond the ring to the coolerbody making it difficult to remove. A thin foil shim 82 of steel placed between the ring and the counterbore solves this problem. The bushing and the shim are held in the counterbore by a special thermal fit, that is, one which allows easy assembly and removal when the bushing and the coolerbody are heated to 400° F.

As is best seen in FIG. 4, an insulating hat 88 encloses the coolerbody to protect it from the melt. The lower face of the hat is generally coextensive with the coolerbody face 50a and a mounting flange 64. The hat 88 is formed from any suitable refractory material such as cast silica. The hat allows the mold assembly to be immersed in the melt to any preselected depth. While immersion to a level below the casting zone is functional, the extremely high production speed characteristics are in part a result of a relatively deep immersion, at least to the level of the casting zone and preferably to at least the mid point of the coolerbody. One advantage of this deep immersion is to facilitate feeding the melt to the liquid core of the casting in the casting zone.

A vapor shield 89 and gaskets 90 are placed in the gap between the hat and the coolerbody adjacent the die to prevent the melt and vapors from entering the gap and to further thermally insulate the coolerbody. The gaskets are preferably three or four annular layers or "donuts" of the aforementioned "Fiberfrax" refractory fiber material while the vapor shield is preferably a "donut" of molybdenum foil interposed between the gaskets 90. The shield 89 and gaskets 90 extend from the die extension 48a to the outer diameter of the coolerbody. The combined thickness of these layers is sufficient to firmly engage the coolerbody face 50a and the end face of the hat 88, typically one-quarter inch.

A major advantage of the invention is that it is possible to achieve withdrawal rates more than ten times faster than conventional closed mold alloy casting systems. Expressed in a net withdrawal speed, this invention makes feasible high commercial production speeds of eighty to four hundred inches per minute depending on the alloy, strand size, and other variables.

While the disclosure has been directed to a brazed cooler body of a continuous copper strand casting apparatus, the claimed invention has not been limited to the brazing of a particular device.

We claim:

1. A method for brazing a surface of an age hardened chrome copper member to a surface of a stainless steel member comprising the steps of
    plating said surfaces with copper,
    applying a braze material of a copper/gold alloy between said surfaces,
    applying a brazing paste of said copper/gold alloy between said surfaces,
    urging said surfaces toward one another, said brazing material and said braze paste,
    heating said alloys to a temperature below the fusing point of said braze material in a protected atmosphere,
    rapidly heating said materials to fuse said braze material in a protected atmosphere, and
    cooling said materials in a protected atmosphere after said rapid heating.

2. The brazing method of claim 1 wherein said brazing material and brazing paste material is approximately 60% cooper and 40% gold.

3. The brazing method of claim 1 wherein said heating below the fusing point is for approximately ten minutes.

4. A brazing method according to claim 1 wherein said plating produces a copper layer having a thickness in the range of 0.001 to 0.002 inch.

* * * * *